(12) United States Patent
Choi (10) Patent No.: US 8,268,463 B2
(45) Date of Patent: Sep. 18, 2012

(54) SECONDARY BATTERY AND METHOD OF FABRICATING THE SAME

(75) Inventor: Bumkuk Choi, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 197 days.

(21) Appl. No.: 11/907,940

(22) Filed: Oct. 18, 2007

(65) Prior Publication Data

US 2008/0107964 A1    May 8, 2008

(30) Foreign Application Priority Data

Oct. 19, 2006 (KR) .................. 10-2006-0102060

(51) Int. Cl.
*H01M 10/04* (2006.01)
*H01M 2/08* (2006.01)
(52) U.S. Cl. ............... 429/7; 429/62; 429/178
(58) Field of Classification Search ............... 429/7, 62
See application file for complete search history.

(56) References Cited

U.S. PATENT DOCUMENTS

| | | | |
|---|---|---|---|
| 2003/0180582 A1 | 9/2003 | Masumoto et al. | |
| 2005/0112456 A1* | 5/2005 | Kozu et al. | 429/62 |
| 2005/0153195 A1 | 7/2005 | Han | |
| 2006/0083982 A1 | 4/2006 | Jung et al. | |
| 2007/0026302 A1* | 2/2007 | Yoon | 429/129 |

FOREIGN PATENT DOCUMENTS

| | | |
|---|---|---|
| JP | 200386159 A | 3/2003 |
| KR | 1020040081105 | 9/2004 |
| KR | 1020050081175 | 8/2005 |
| KR | 100571272 | 4/2006 |
| WO | WO 03/069698 | 8/2003 |

OTHER PUBLICATIONS

Stress concentration—Wikipedia at http://en.wikipedia.org/wiki/Stress_concentration, May 2011.
Japanese Office Action issued by JPO, dated Apr. 26, 2011, corresponding to Japanese Patent Application No. 2007-260052, together with Request for Entry.

* cited by examiner

*Primary Examiner* — John S Maples
(74) *Attorney, Agent, or Firm* — Robert E. Bushnell, Esq.

(57) ABSTRACT

The present invention relates to a secondary battery and a method of fabricating the same. In a secondary battery according to an embodiment of the invention, holding members for holding a molded resin member are formed on a cap plate of a bare cell, which prevents the molded resin member from being distorted or detached from the cap plate of the bare cell when battery parts, such as a protection circuit board and a secondary protection element, are coupled to the bare cell by the molded resin member.

12 Claims, 6 Drawing Sheets

SECONDARY BATTERY AND METHOD OF FABRICATING THE SAME

CLAIM OF PRIORITY

This application makes reference to, incorporates the same herein, and claims all benefits accruing under 35 U.S.C. §119 from an application for SECONDARY BATTERY AND METHOD OF FABRICATING THE SAME earlier filed in the Korean Intellectual Property Office on 19 Oct. 2006 and there duly assigned Serial No. 10-2006-0102060.

BACKGROUND OF THE INVENTION

1. Field of the Invention

The present invention relates to a secondary battery, and more particularly, to a secondary battery capable of improving bonding power between a molded resin member and an upper part of a bare cell to improve the adhesion of a protection circuit board and a secondary protection element to the bare cell.

2. Description of Related Art

In general, with a reduction in the sizes and an improvement in the performance of portable wireless apparatuses, such as video cameras, mobile phones, and notebook computers, numerous researches on secondary batteries used as power sources for the portable wireless apparatuses have been made. Such secondary batteries include, for example, a nickel-cadmium battery, a nickel-metal hydride battery, a nickel-zinc battery, and a lithium secondary battery. Among them, the lithium secondary battery that is rechargeable and can be made in a small size with a high capacity has come into widespread use in the field of high-tech electronic apparatuses due to its advantages such as high operation voltage and high energy density per unit weight.

In the lithium secondary battery, an electrode assembly including a positive electrode plate, a negative electrode plate, and a separator is put into a metal can, an electrolyte is injected into the can, and the can is sealed up, thereby forming a bare cell. In general, the bare cell has an electrode terminal insulated from the can at an upper part thereof. The electrode terminal has a positive or negative polarity of the lithium secondary battery, and the can has the other polarity. Therefore, the positive electrode plate of the electrode assembly is connected to one of the can and the electrode terminal, and the negative electrode plate is connected to the other of the can and the electrode terminal.

A safety device, such as a protecting circuit module (PCM) including a protection circuit board and a secondary protection element, such as a positive temperature coefficient (PTC) element or bimetal, is connected to the top or the side of the sealed bare cell, and the bare cell having the safety device connected thereto is put into a battery pack, or it is molded with resin to form a lithium secondary battery. In this case, the safety devices of the lithium secondary battery are connected respectively to a positive electrode and a negative electrode to break a current when the voltage of the battery is suddenly increased due to the overheat or over discharge of the battery, thereby preventing the explosion of the battery.

In general, in the secondary batteries, the bare cell, protection circuit board and other battery parts are fixed by the molded resin member to form a battery pack.

The molded resin member, however, is not formed of the same material as that forming the bare cell including the cap plate and the can that is made of a metallic material, and the contact area between the molded resin member and the bare cell is small, which results in low adhesion. As a result, the molded resin member is not kept at its normal position on the bare cell, and is distorted or detached from the bare cell.

SUMMARY OF THE INVENTION

It is therefore, one object of the present invention to provide an improved secondary battery and an improved process for manufacturing a secondary battery.

It is another object solve the above-described drawbacks, and an aspect of the present invention is to provide a secondary battery capable of improving bonding power between a molded resin member and an upper part of a bare cell to improve the adhesion of a protection circuit board and a secondary protection element to the bare cell. The molded resin member is molded in place.

In order to accomplish the aspect of the present invention, a secondary battery includes: an electrode assembly which a positive electrode plate, a negative electrode plate, and a separator of insulating the positive electrode plate from the negative electrode plate are wound in sequence; a can housing the electrode assembly; and a bare cell including a cap assembly that has a cap plate sealing up an upper open portion of the can and an electrode terminal which is inserted into a through hole formed in the cap plate with a gasket interposed therebetween; a molded resin member which is filled between the cap plate of the bare cell and the protection circuit board; a protection circuit board coupled to an upper part of the bare cell by the molded resin member; and holding protrusions that have holding portions for holding the molded resin member and are formed on the cap plate of the bare cell.

According to another aspect of the invention, a secondary battery includes: an electrode assembly which a positive electrode plate, a negative electrode plate, and a separator of insulating the positive electrode plate from the negative electrode plate are wound in sequence: a can housing the electrode assembly; a bare cell including a cap assembly which has a cap plate sealing up an upper open portion of the can and an electrode terminal which is inserted into a through hole formed in the cap plate with a gasket interposed therebetween; a molded resin member which is filled between the cap plate of the bare cell and the protection circuit board; a protection circuit board coupled to an upper part of the bare cell by a molded resin member; at least one projecting portion formed in the electrode terminal of the cap assembly of the bare cell; and holding protrusions which include holding portions for holding the molded resin member and are formed on the cap plate of the bare cell.

According to still another aspect of the invention, there is provided a method of fabricating a secondary battery including an electrode assembly, a can housing the electrode assembly and an electrolyte, and a cap assembly having a cap plate sealing up an upper open portion of the can. The method includes steps of performing pressing on a lower surface of the cap plate upward to form a body of a holding protrusion projecting from an upper surface of the cap plate, supporting a lower portion of the holding protrusion projecting from the upper surface of the cap plate with a supporting member, and striking the top of the holding protrusion with a punch to expand the cross section of the top of the holding protrusion to form a holding portion of the holding protrusion.

According to the above-mentioned aspects of the invention, it is possible to prevent the molded resin member for coupling battery parts, such as a protection circuit board and a secondary protection element to the bare cell from being distorted or detached from the upper surface of the cap plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the invention will be described in detail with reference to the accompanying drawings.

Figure 1:
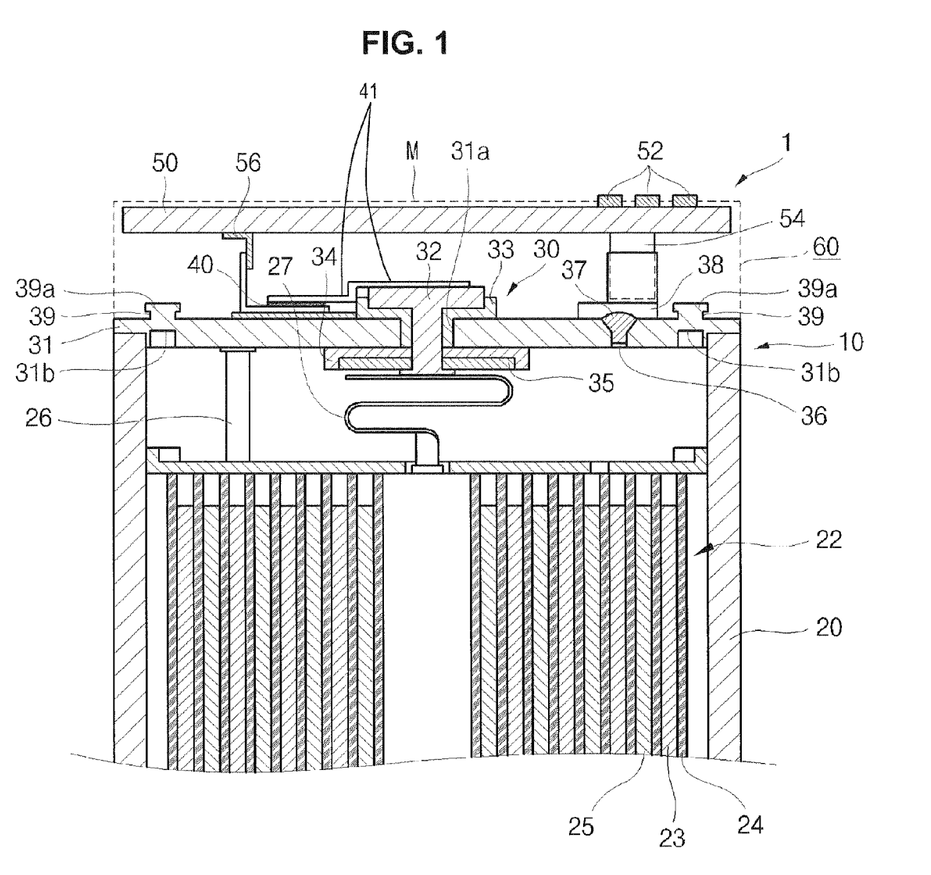
FIG. 1 is a partial sectional view illustrating a secondary battery according to one embodiment of the invention.
Figure 2:
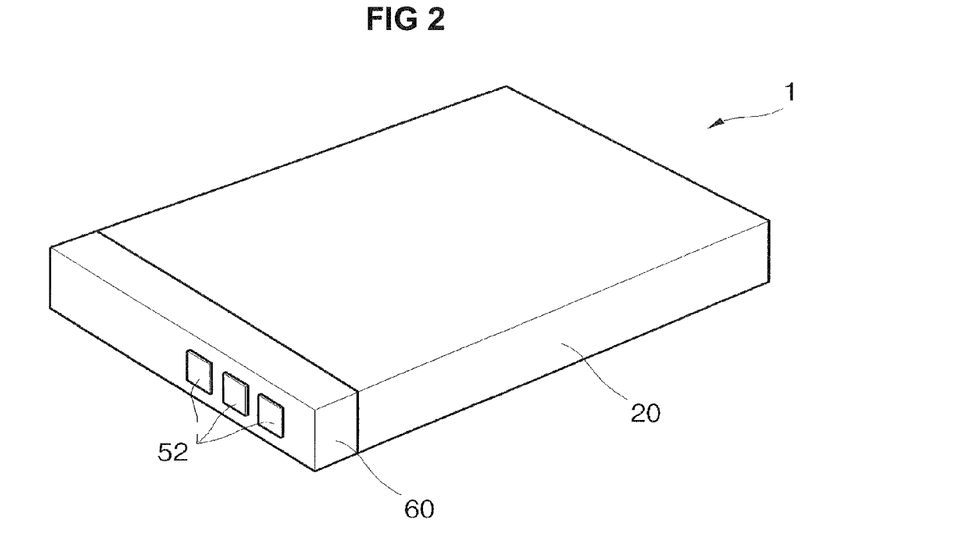
FIG. 2 is a perspective view illustrating the appearance of the secondary battery illustrated in FIG. 1.

FIG. 1 is a partial sectional view of a lithium secondary battery before resin is molded, and FIG. 2 is a perspective view illustrating the lithium secondary battery after resin is molded.

A lithium secondary battery 1 according to the present invention includes a bare cell 10 and a protection circuit board 50 provided at an upper part of bare cell 10. In addition, the lithium secondary battery 1 may include a secondary protection element 40 provided at an upper part of bare cell 10. Secondary protection element 40 may be provided on the side of bare cell 10 according to the structure of the lithium secondary battery.

Bare cell 10 includes a can 20, an electrode assembly 22, and a cap assembly 30. Can 20 is a box-shaped container having an upper portion open and may be formed of conductive metal such as aluminum or aluminum alloy having a small weight and corrosion resistance. Can 20 has electrode assembly 22 including a positive electrode plate 23, a separator 24, and a negative electrode plate 25 and an electrolyte provided therein, and the upper open portion of can 20 is closed up with the cap assembly 30 after electrode assembly 22 is inserted into can 20 through the upper open portion.

Electrode assembly 22 has positive electrode plate 23, negative electrode plate 25, and separator 24 interposed therebetween, which are wound. Positive electrode plate 23 is electrically connected to a cap plate 31 through a positive electrode tab 26, and negative electrode plate 25 is connected to a negative electrode terminal 32 through a negative electrode tab 27 so as to be insulated from cap plate 31.

Therefore, can 20 is electrically insulated from negative electrode terminal 32 and serves as a positive electrode terminal.

Cap assembly 30 is fixed to the edge of the upper open portion of can 20 by welding, and then an electrolyte is injected into can 20 through an electrolyte injection hole 36 formed on one side of cap plate 31. After the electrolyte is completely injected into can 20, electrolyte injection hole 36 is closed up by a separate sealing member, such as a stopper 37.

Cap assembly 30 has a flat cap plate 31 having size and shape corresponding to the upper open portion of can 20. Cap plate 31 is preferably formed of, for example, aluminum or aluminum alloy that is the same material as that forming can 20 in order to improve weldability to can 20. A through hole is formed in the center of cap plate 31 so that negative electrode terminal 32, which is an electrode terminal, can pass through the through hole. A tube-shaped gasket 33 is provided outside electrode terminal 32 passing through the center of cap plate 31 to electrically insulate electrode terminal 32 from cap plate 31. An insulating plate 34 is provided on the lower surface of cap plate 31 in the vicinity of the through hole of cap plate 31. A terminal plate 35 is provided on the lower surface of insulating plate 34.

The secondary protection element 40 is provided on the upper surface of the cap plate 31 to connect the negative electrode terminal 32 and the protection circuit board 50. For example, a positive temperature coefficient (PTC) element, a bimetal element, or a thermal fuse may be used as the secondary protection element 40. When the PTC element is used as the secondary protection element 40, an insulating tape is wound around the PTC element several times for insulation from the cap plate 31. The wiring 41 electrically connects the secondary protection element 40 and the negative electrode terminal 32.

Protection circuit board 50 is formed by mounting a plurality of electric elements on a printed circuit board (PCB) having a wiring pattern formed thereon, and controls the overall operation including charging and discharging of the lithium secondary battery. Protection circuit board 50 is electrically connected to electrode terminals 32 and 38 of bare cell 10 by board lead plates 56 and 54, respectively, so that it is electrically connected to electrode assembly 22. Electrode terminals 52 for electrical connection to an external apparatus are formed on the top of the protection circuit board 50.

In the lithium secondary battery 1 illustrated in FIG. 1, an area represented by a dotted line (M) is molded with resin to form a molded resin member surrounding cap assembly 30, secondary protection element 40, and protection circuit board 50, thereby forming the appearance of the lithium secondary battery.

As illustrated in the perspective view of FIG. 2, the appearance of the secondary battery that is completely assembled includes lower can 20 and a molded resin member 60. Electrode terminals 52 of protection circuit board 50 are exposed from the upper surface of molded resin member 60.

In the secondary battery according to one embodiment of the invention, holding protrusions 39 each having a hook-shaped holding portion at the top thereof are formed at both sides of the upper surface of cap plate 31 which is sealing up an upper part of the bare cell. Holding protrusions 39 generally have T shapes in sectional view. That is, in this embodiment of the invention, holding portion 39a is formed at the top of holding protrusion 39 so as to extend in parallel to the cap plate 31.

Holding protrusion 39 is preferably formed of aluminum or aluminum alloy that is the same material as that forming cap plate 31. However, the sectional shape of the projecting portion is not limited to the T shape. The holding protrusion having the T shape in sectional view has an advantage in that it can be easily manufactured.

A method of forming the holding protrusion having the T shape in sectional view according to one embodiment of the invention will be described with reference to FIGS. 3A and 3B.

The T-shaped holding protrusions according to this embodiment of the invention are generally formed by processing I-shaped protrusions which are formed at both sides of the upper surface of cap plate 31 so as to have positive polarities. For example, the polarities of the protrusions may be changed according to fabricating conditions.

Figure 3A:
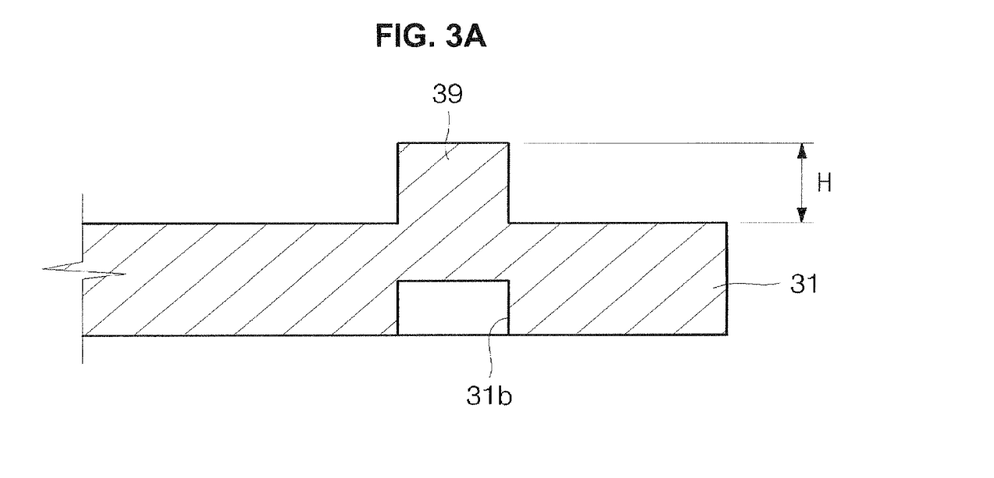
FIGS. 3A to 3D are cross-sectional views illustrating in sequence a method of fabricating a holding protrusion of the secondary battery according to one embodiment of the invention.

First, as illustrated in FIG. 3A, press punching is performed on the lower surface of the cap plate 31 upward to form a body of holding protrusion 39. And the lower surface of the cap plate 31 has a recess 31*b* formed in correspondence with the holding protrusion 39.

Figure 3B:
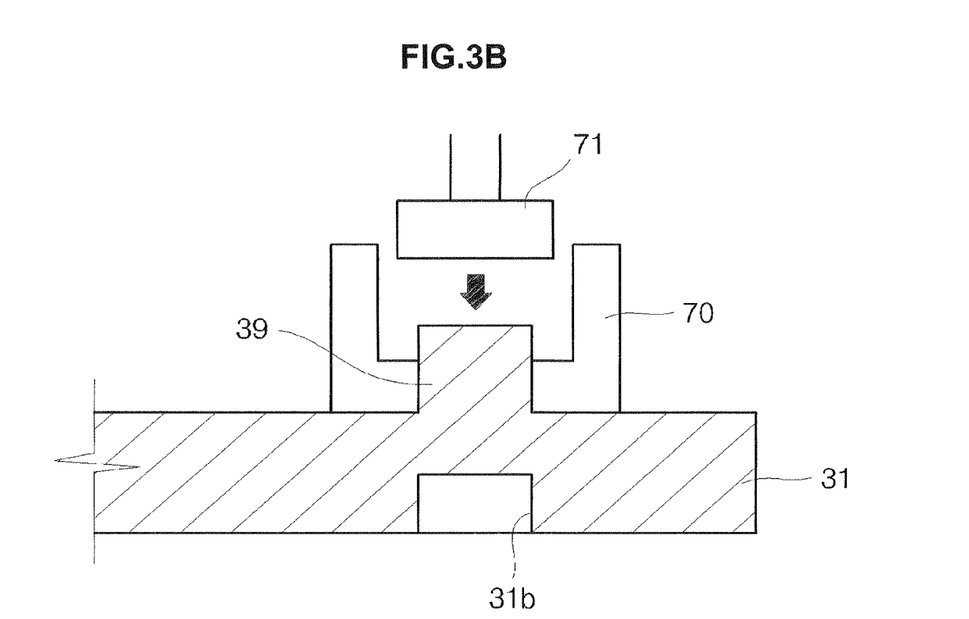

FIG. 3B is a cross-sectional view illustrating the body of one of the I-shaped holding protrusions formed at both sides of the upper surface of the cap plate of the bare cell with a lower portion of the body being firmly supported by a supporting member 70. A punch 71 is placed above the holding protrusion on the upper surface of the cap plate with the lower portion of holding protrusion 39 being firmly supported by supporting member 70.

Figure 3C:
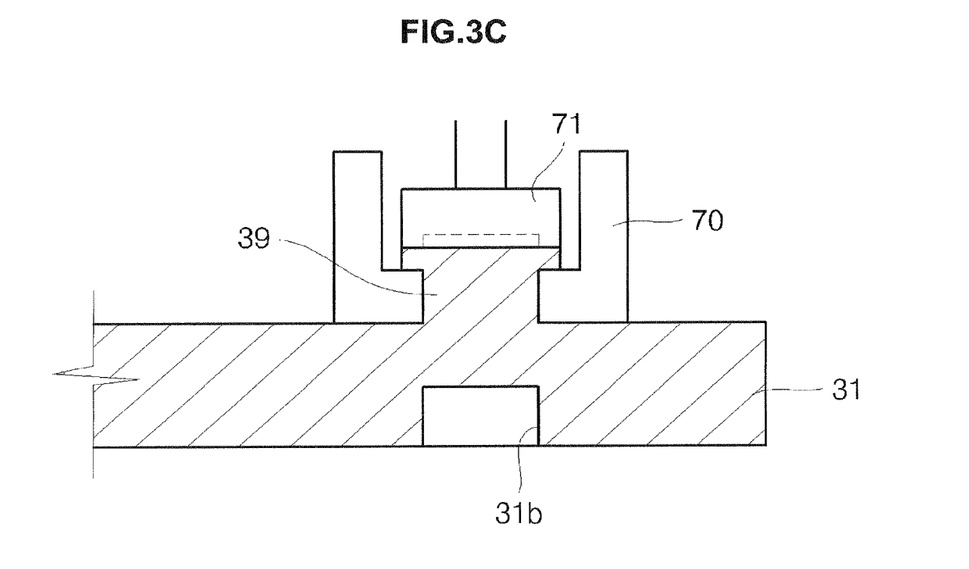
Figure 3D:
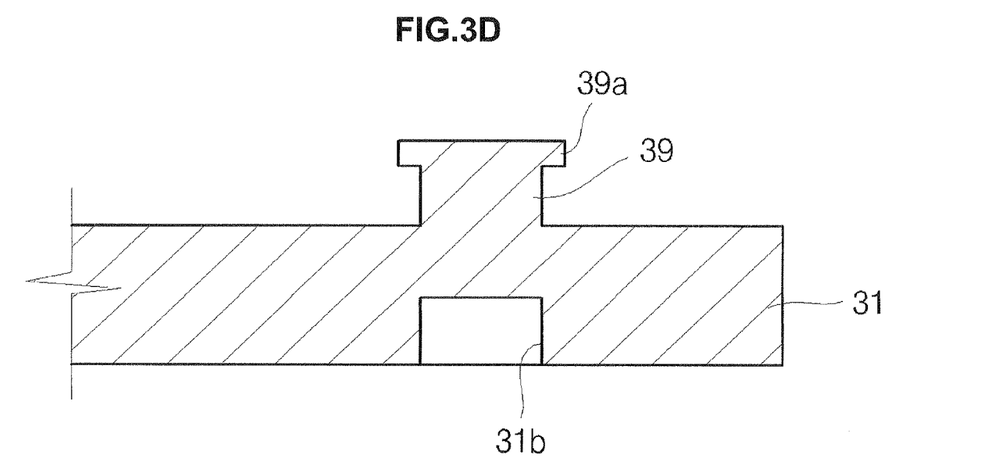

Then, as illustrated in FIG. 3C, when punch 71 drops from an upper side of holding protrusion 39 to strike the top of holding protrusion 39, the cross section of the top of the holding protrusion is expanded to form holding portion 39*a* at the top of the holding protrusion. Therefore, as illustrated in FIG. 3D, finally, holding protrusion 39 has a T shape in sectional view.

As described above, reprocessing the existing holding protrusion is the simplest fabricating method in forming a holding protrusion having a holding portion on the upper part thereof. In this case, referring to FIG. 3A, the height (H) of the holding protrusion should be longer as much as one third of the holding protrusion in the prior art. For example, when the holding protrusion according to the related art has a height of 0.4 mm, the holding protrusion according to this embodiment preferably has a height H of 0.6 mm. This is because the height of the holding protrusion is reduced by pressure applied to the top of the holding protrusion when the holding portion is formed.

Figure 4:
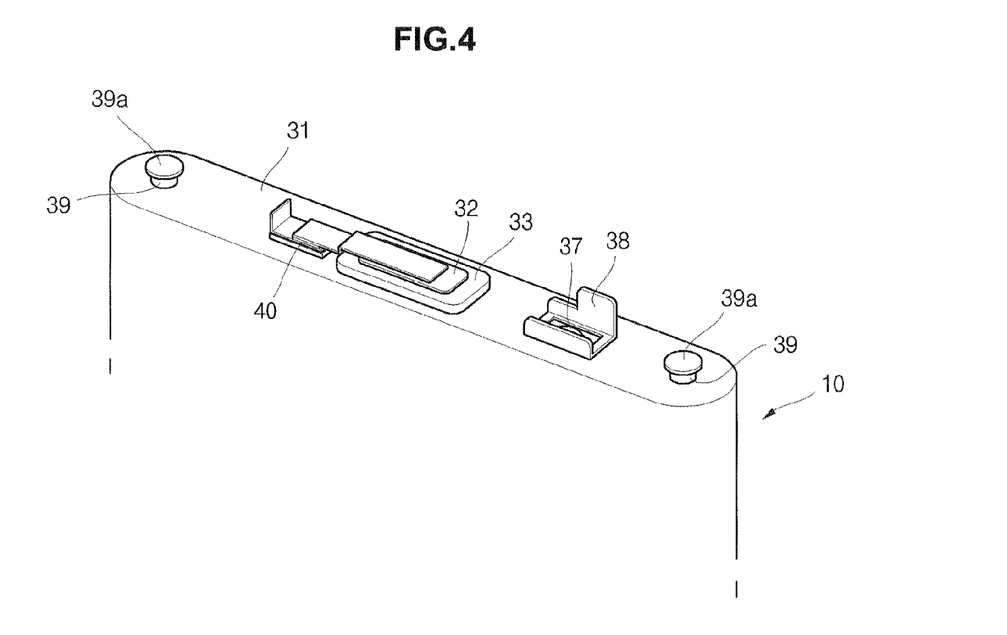
FIG. 4 is a perspective view illustrating a bare cell of the secondary battery according to one embodiment of the invention.

FIG. 4 is a perspective view illustrating the bare cell before the protection circuit board is coupled to the bare cell by the molded resin member. As illustrated in FIG. 4, holding protrusions 339 having holding portions 39*a* formed at the top thereof are integrally formed at both sides of cap plate 31 which is welded to the upper open portion of bare cell 10.

The method of fabricating the holding protrusions is not necessarily limited to the above. For example, holding protrusions having additional holding portions at the tops thereof may be manufactured, and the holding protrusions may be fixed to the cap plate by welding or an adhesive. Alternatively, through holes may be formed in the cap plate, and separate holding protrusions may be fitted into the through holes by pressure. In addition, various fabricating methods other than the above-mentioned methods may be used.

However, preferably, according to this embodiment, the holding protrusions are integrally formed with the cap plate by pressing. In this case, it is possible to improve bonding power between the cap plate and the molded resin member by the holding protrusions.

Figure 5:
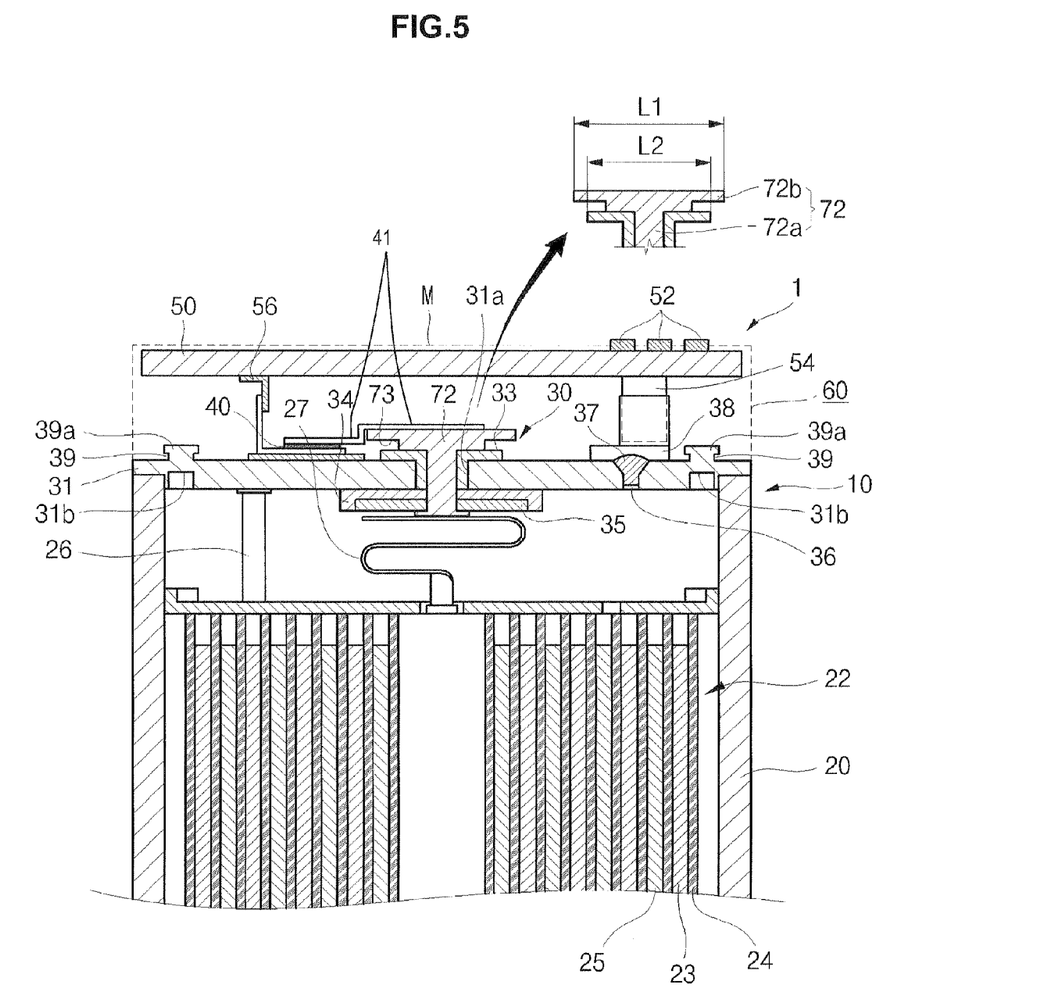
FIG. 5 is a partial sectional view illustrating a secondary battery according to another embodiment of the invention.

As illustrated in FIG. 5, in a secondary battery according to another embodiment of the invention, the holding protrusions 39 having the holding portions formed at the tops thereof are formed at both sides of the upper surface of the cap plate 31 which is sealing up the upper open portion of the bare cell 10. And the lower surface of the cap plate 31 has a recess 31*b* formed in correspondence with the holding protrusion 39. In addition, a projecting portion 73 is formed in a negative electrode terminal 72 that passes through a through hole to be exposed from the cap plate 31 and is insulated from the cap plate 31. The projecting portion 73 is composed of at least more than one step portion, and is symmetric with respect to a body of the negative electrode terminal.

Specifically, negative electrode terminal 72 according to this embodiment of the invention includes a body, or core 72*a* passing through a through hole 31*a* of cap plate 31 and a head 72*b* that is integrally formed with the top of the body and is formed as a peripheral flange that serves to hold the molded resin member 60 in place. Body 72*a* of the negative electrode terminal sufficiently extends to form a space separated from gasket 33. That is, a space between the lower surface of head 72*b* of the negative electrode terminal and the upper surface of gasket 33 is formed, and resin is injected into the space.

The length (L1) of head 72*b* of the negative electrode terminal in the widthwise direction is longer than the length (L2) of gasket 33 projecting from the upper surface of cap plate 31. Therefore, resin forming a molded resin member is filled into the space between head 72*b* of the negative electrode terminal and cap plate 31. Thus, projecting portion 73 can extend to an enough length to connect the secondary protection element.

In addition, at least one projecting portion 73 is formed on the lower surface of the head of the negative electrode terminal, and resin is filled into a space between projecting portion 73 and the cap plate to form a molded resin member, which makes it possible to improve bonding power of the molded resin member.

Figure 6:
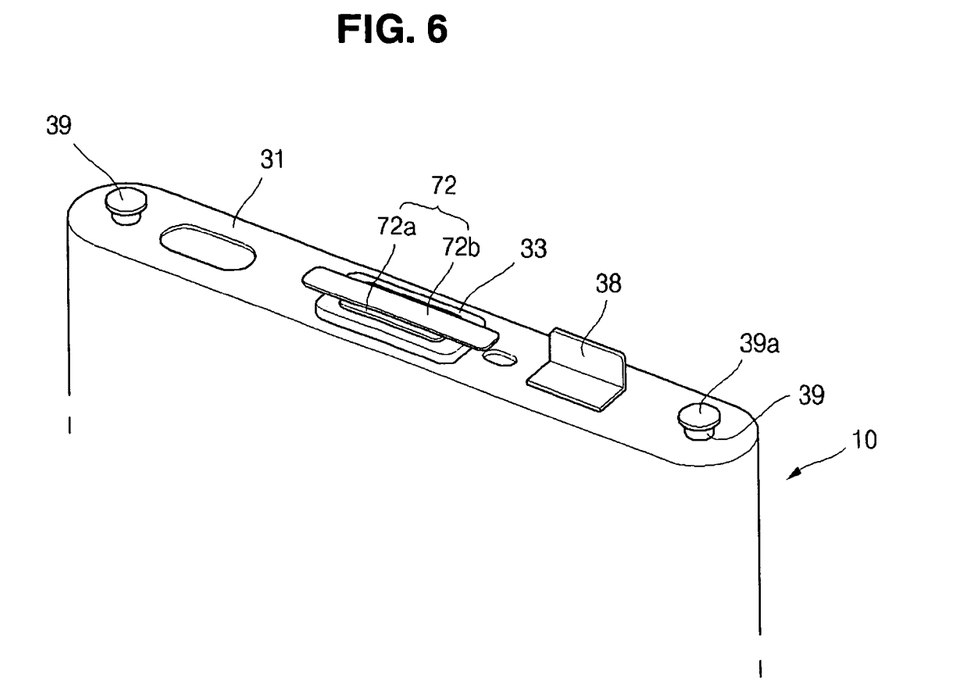
FIG. 6 is a perspective view illustrating a bare cell of the secondary battery according to another embodiment of the invention.

FIG. 6 is a perspective view illustrating the appearance of the bare cell before a protection circuit board is coupled to the bare cell by the molded resin member. More specifically, FIG. 6 shows head 72*b* of the negative electrode terminal 72 having a width larger than that of gasket 33.

According to the second embodiment of the invention, it is possible to further improve bonding power between the cap plate and the bare cell.

As described above, according to the second batteries of the above-described embodiments, it is possible to considerably improve bonding power between the bare cell and the molded resin member. Therefore, battery parts, such as the protection circuit board and the secondary protection element, are stably fixed to the bare cell by the molded resin member, which prevents the battery parts from being distorted or detached from the bare cell.

Since the holding protrusions are integrally formed with the cap plate by pressing, a fabricating process is simplified, and the molded resin member is firmly fixed to the cap plate. Therefore, the holding protrusions according to the embodiment of the invention can firmly fix the molded resin member to the bare cell, as compared to general fixing protrusions according to the related art.

As described above, although the exemplary embodiments of the invention have been described above, the invention is not limited thereto. Therefore, it would be appreciated by those skilled in the art that various modifications and changes of the invention can be made without departing from the scope and spirit of the invention, the scope of which is defined in the appended claims and their equivalents.

What is claimed is:

1. A secondary battery, comprising:
   an electrode assembly having a positive electrode plate, a negative electrode plate, and a separator interposed between the positive electrode and the negative electrode wound in sequence;
   a can housing the electrode assembly;
   a bare cell including a cap assembly having a cap plate sealing an upper open portion of the can and an electrode terminal inserted into a through hole formed in the cap plate with a gasket interposed therebetween and at least one projecting portion integrally formed in the electrode terminal to extend transversely outward from the electrode terminal;

a resin member molded to fill between the cap plate of the bare cell and a protection circuit board and to fill between the cap plate and the projecting portion;

the protection circuit board coupled to and being held spaced-apart from the bare cell by the molded resin member; and holding protrusions projecting from one surface of the cap plate, holding portions extending transversely from distal sections of the holding protrusions and engaging the molded resin member between the cap plate and the protection circuit board, and recesses disposed on an opposite surface of the cap plate and each of the recesses geometrically corresponding to each of the holding protrusions.

2. The secondary battery as claimed in claim 1,
wherein the holding portions are formed at a top of the holding protrusions so as to extend in parallel to the cap plate.

3. The secondary battery as claimed in claim 2, wherein the holding protrusions being formed in T shapes in sectional view.

4. The secondary battery as claimed in claim 1,
wherein the holding protrusions are formed at both sides of an upper surface of the cap plate.

5. The secondary battery as claimed in claim 1,
wherein the cap plate and the holding protrusions are formed of aluminum or aluminum alloy.

6. A secondary battery, comprising:
an electrode assembly having a positive electrode plate, a negative electrode plate, and a separator insulating the positive electrode plate from the negative electrode plate wound in sequence;

a can housing the electrode assembly;

a bare cell including a cap assembly which has a cap plate comprised of a head bearing a projecting portion comprised of at least one step portion, said cap plate sealing an upper open portion of the can and an electrode terminal which is inserted into a through hole formed in the cap plate with a gasket interposed therebetween;

a resin member molded to fill between the cap plate of the bare cell and a protection circuit board;

the protection circuit board coupled to an upper part of the bare cell by the molded resin member; and at least one projecting portion integrally formed in the electrode terminal to extend radially outwardly from the electrode terminal and engage a portion of the resin member disposed between the gasket and an underside of the projecting portion.

7. The secondary battery as claimed in claim 6, wherein said electrode terminal comprises said projecting portion holding the molded resin member formed on the cap plate of the bare cell.

8. The secondary battery as claimed in claim 7,
wherein holding protrusions are formed on the cap plate and have T shapes in sectional view.

9. The secondary battery as claimed in claim 8,
wherein the holding protrusions are formed at both sides of an upper surface of the cap plate.

10. The secondary battery as claimed in claim 8,
wherein the cap plate and the holding protrusions are formed of aluminum or aluminum alloy.

11. The secondary battery as claimed in claim 6,
wherein the electrode terminal includes a body and a head which is formed at a top of the body so as to extend in a widthwise direction, and the projecting portion is formed on a lower surface of the head.

12. The secondary battery as claimed in claim 11,
wherein the width of the head of the electrode terminal is longer than the width of the gasket.

* * * * *